(12) United States Patent
Kludt et al.

(10) Patent No.: US 7,746,946 B2
(45) Date of Patent: Jun. 29, 2010

(54) PERFORMING A SCAN OF DIVERSITY PARAMETER DIFFERENCES

(75) Inventors: Kenneth A. Kludt, Bedminster, NJ (US); Yair Karmi, Bridgewater, NJ (US); Wei Sun, Hillsborough, NJ (US); Haim Harel, New York, NY (US)

(73) Assignee: Magnolia Broadband Inc., Warren, NJ (US)

( * ) Notice: Subject to any disclaimer, the term of this patent is extended or adjusted under 35 U.S.C. 154(b) by 1076 days.

(21) Appl. No.: 11/247,534

(22) Filed: Oct. 10, 2005

(65) Prior Publication Data

US 2007/0081607 A1    Apr. 12, 2007

(51) Int. Cl.
    *H04B 7/02* (2006.01)
(52) U.S. Cl. .................. 375/267; 375/257; 375/252
(58) Field of Classification Search .............. 375/267; 370/252
    See application file for complete search history.

(56) References Cited

U.S. PATENT DOCUMENTS

| | | | |
|---|---|---|---|
| 5,642,353 A | 6/1997 | Roy, III et al. | |
| 5,832,044 A | 11/1998 | Sousa et al. | |
| 5,991,330 A | 11/1999 | Dahlman et al. | |
| 5,999,826 A | 12/1999 | Whinnett | |
| 6,167,286 A * | 12/2000 | Ward et al. | 455/562.1 |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 6,492,942 B1 | 12/2002 | Kezys | |
| 6,636,495 B1 | 10/2003 | Tangemann | |
| 6,704,370 B1 | 3/2004 | Chheda et al. | |
| 6,745,009 B2 | 6/2004 | Raghothaman | |
| 6,810,264 B1 | 10/2004 | Park et al. | |

(Continued)

FOREIGN PATENT DOCUMENTS

EP    0 986 193    3/2000

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner*—David C Payne
*Assistant Examiner*—Tanmay K Shah
(74) *Attorney, Agent, or Firm*—Pearl Cohen Zedek Latzer, LLP

(57) ABSTRACT

Modifying a signal according to a diversity parameter adjustment includes accessing scan parameter values, where a scan parameter describes a scan process. The scan parameter values include diversity parameter vectors, where a diversity parameter vector has a diversity parameter value for each of one or more diversity parameters. The scan process is performed by repeating the following for each diversity parameter vector: modifying a signal according to the diversity parameter values of the diversity parameter vector, where the signal is transmitted from a modifying communication device to a feedback communication device; and receiving a feedback signal reflecting feedback information describing the signal as received by the feedback communication device.

20 Claims, 2 Drawing Sheets

U.S. PATENT DOCUMENTS

| | | |
|---|---|---|
| 6,859,643 B1 | 2/2005 | Ma et al. |
| 6,882,228 B2 | 4/2005 | Rofougaran |
| 2003/0112880 A1 | 6/2003 | Walton et al. |
| 2004/0048584 A1 | 3/2004 | Vaidyanathan et al. |
| 2004/0066754 A1* | 4/2004 | Hottinen .................... 370/252 |
| 2004/0085239 A1 | 5/2004 | Ukena et al. |
| 2005/0059355 A1 | 3/2005 | Liu |
| 2005/0143113 A1 | 6/2005 | Lee et al. |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| EP | 1 262 031 | 1/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

International Search Report for International Application No. PCT/US2006/039400 mailed Feb. 2, 2007.

Pending U.S. Appl. No. 10,963,046 entitled, "*Determining A Power Control Group Boundary Of A Power Control Group*", 40 pages specification, claims and abstract, 8 pages of drawings, inventors Qing (nmi) Li, et al, Oct. 12, 2004.

Pending U.S. Appl. No. 11/159,646 entitled, "*Modifying A Signal In Response To Quality Indicator Availability*", 37 pages specification, claims and abstract, 7 pages of drawings, inventors Haim (nmi) Harel, et al, Jun. 23, 2005.

The Eagle Series, Comprehensive CDMA Pilot Scanners, Berkeley Varitronics Systems, http://www.bvsystems.com/Products/CDMA/Eagle/eagle.htm, 9 total pages, printed Oct. 8, 2005.

* cited by examiner

PERFORMING A SCAN OF DIVERSITY PARAMETER DIFFERENCES

TECHNICAL FIELD

This invention relates generally to the field of wireless communications and more specifically to performing a scan of diversity parameter differences.

BACKGROUND

A transmitting communication device may have multiple antenna elements that transmit signals to communicate information. A receiving communication device extracts the information from the transmitted signals. Multiple antenna elements may enhance spectral efficiency, allowing for more users to be simultaneously served over a given frequency band. The transmitted signals, however, propagate along different paths and may reach the receiving communication device with different phases that destructively interfere. It is generally desirable to reduce interference of transmitted signals.

SUMMARY OF THE DISCLOSURE

In accordance with the present invention, disadvantages and problems associated with previous techniques for determining diversity parameter adjustments may be reduced or eliminated.

According to one embodiment of the present invention, modifying a signal according to a diversity parameter adjustment includes accessing scan parameter values, where a scan parameter describes a scan process. The scan parameter values include diversity parameter vectors, where a diversity parameter vector has a diversity parameter value for each of one or more diversity parameters. The scan process is performed by repeating the following for each diversity parameter vector: modifying a signal according to the diversity parameter values of the diversity parameter vector, where the signal is transmitted from a modifying communication device to a feedback communication device; and receiving a feedback signal reflecting feedback information describing the signal as received by the feedback communication device. Certain embodiments of the invention may provide one or more technical advantages. A technical advantage of one embodiment may be that a diversity parameter scan may be performed to determine optimal diversity parameter values. The optimal diversity parameter values may be used to modify a signal transmitted from a modifying communication device to a feedback communication device. As a first example, the optimal diversity parameter values may be used to modify the signal during scans. As a second example, the optimal diversity parameter values may be used to modify the signal during an interval between scans. As a third example, the optimal diversity parameter values may be used to as initial conditions for a diversity control technique. Another technical advantage of one embodiment may be that consecutive diversity parameter scans may be compared to determine the stability of the environment of the modifying communication device.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
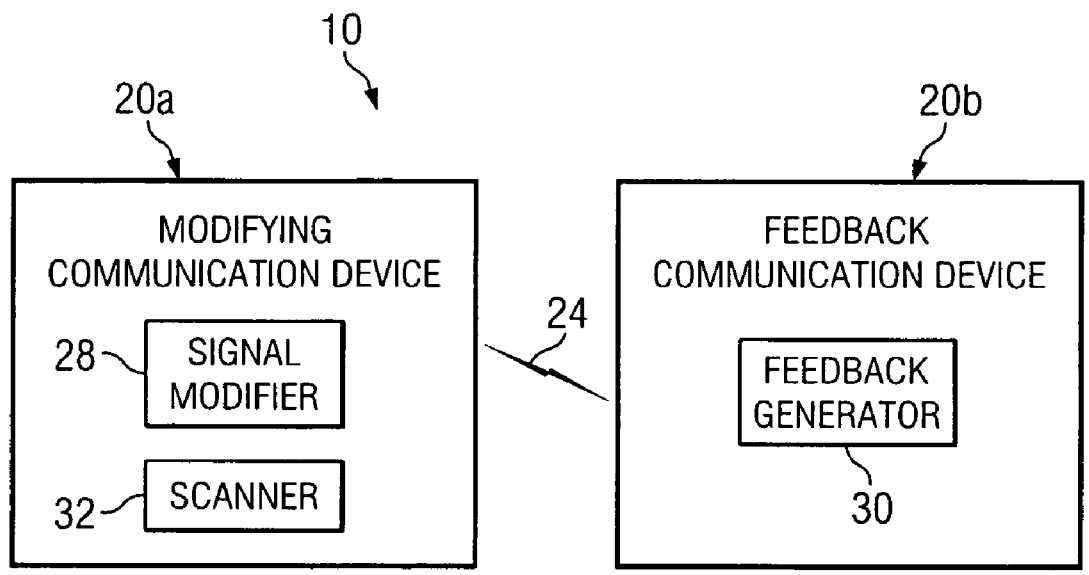
FIG. 1 is a block diagram illustrating one embodiment of a communication network that includes a modifying communication device operable to perform a scan of diversity parameter differences.
Figure 2:
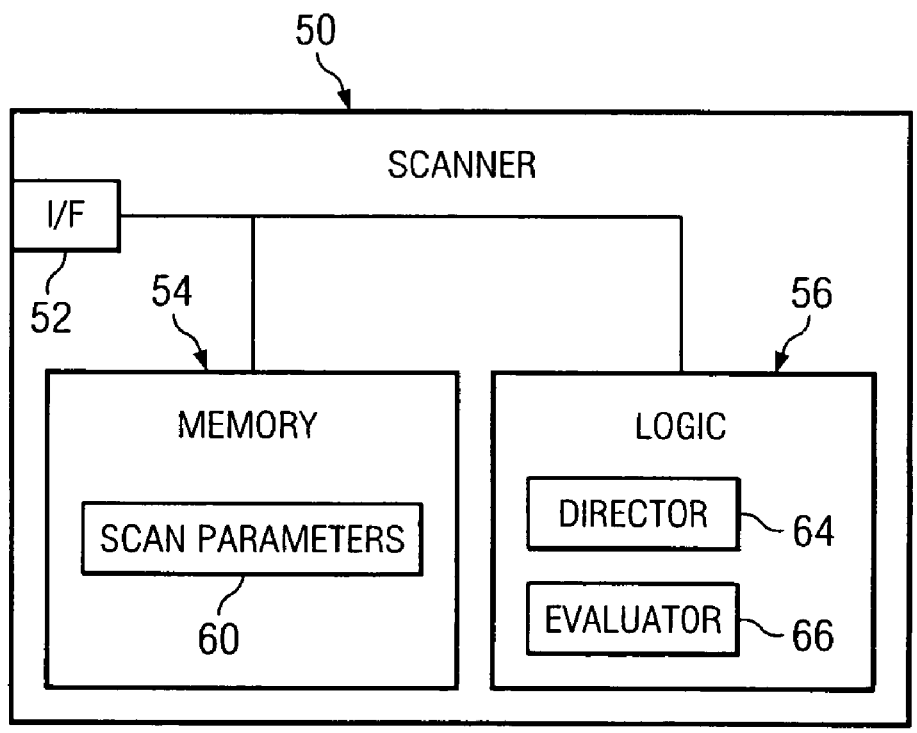
FIG. 2 is a block diagram illustrating one embodiment of a scanner operable to perform a diversity parameter scan that may be used with modifying communication device of FIG. 1.
Figure 3:
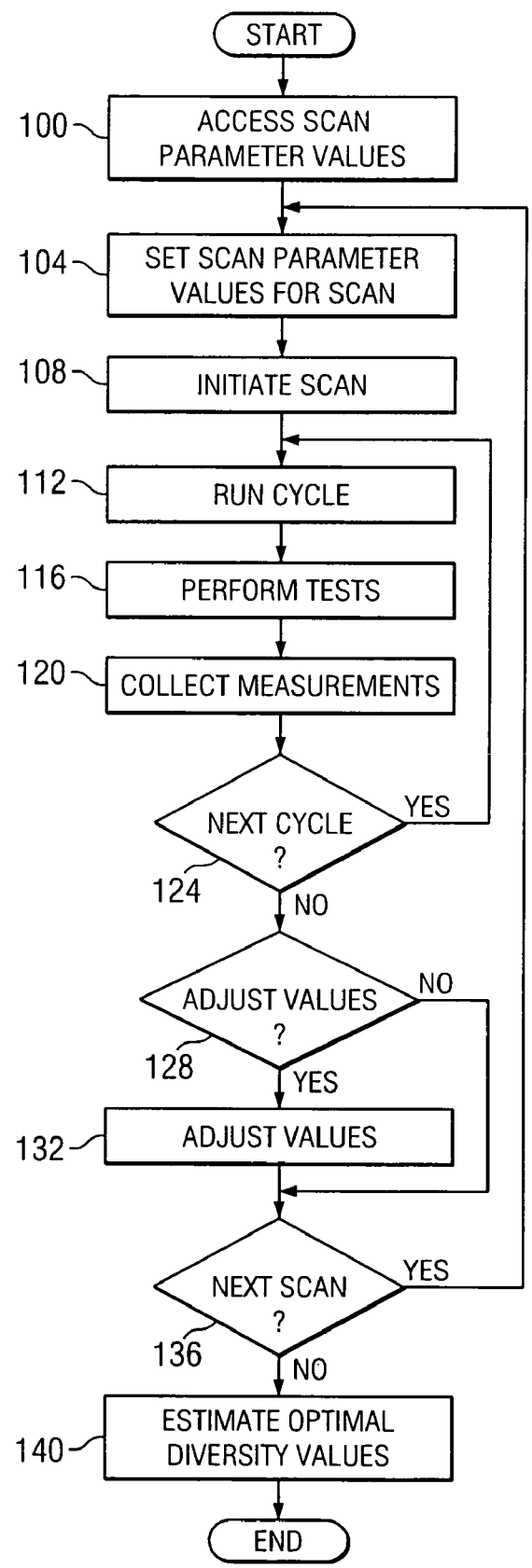
FIG. 3 is a flowchart illustrating one embodiment of a method for performing a diversity parameter scan that may be used by the scanner of FIG. 2.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a communication network 10 that includes a modifying communication device 20a operable to perform a scan of diversity parameter differences. According to the embodiment, modifying communication device 20a applies a diversity parameter adjustment to a signal transmitted to feedback communication device 20b. Feedback communication device 20b returns feedback information that describes the signal as received by feedback communication device 20b. Modifying communication device 20a determines a next diversity parameter adjustment in accordance with the feedback information. According to the embodiment, modifying communication device 20a performs diversity parameter scans to determine optimal diversity parameter values that may be used to modify the signal transmitted to feedback communication device 20b.

According to the illustrated embodiment, network 10 operates to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as the Internet Protocol (IP) may be used to communicate the packets. A packet may comprise any suitable packet, such as a General Packet Radio Service (GPRS) packet, an Enhanced Data for GSM Evolutions (EDGE) packet, or other suitable packet.

Network 10 may utilize communication protocols and technologies to provide the communication sessions. Example communication protocols and technologies include those set by the Institute of Electrical and Electronics Engineers (IEEE) 802.xx, International Telecommunications Union (ITU-T) standards, European Telecommunications Standards Institute (ETSI) standards, Internet Engineering Task Force (IETF) standards, or other standards.

Devices of network 10 may use any suitable multiple access technology, for example, a code division multiple access (CDMA) technology. According to one embodiment, network 10 may operate according to a CDMA 2000 telecommunications technology that uses a single CDMA channel. As an example, a CDMA 2000 high rate data packet technology, such as the Evolution Data Only (EvDO) technology may be used.

Network 10 may comprise any suitable communication network. A communication network may comprise all or a portion of a public switched telephone network (PSTN), a public or private data network, a local area network (LAN), a metropolitan area network (MAN), a wide area network (WAN), a wireline or wireless network, a local, regional, or global communication network (such as the Internet), an enterprise intranet, other suitable communication link, or any combination of the preceding.

Network 10 includes one or more modifying communication devices 20a and one or more feedback communication devices 20b that communicate via a wireless link 24. A communication device 20 represents any device operable to communicate information via signals with one or more other communication devices 20. For example, communication device 20 may comprise a subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (SIP) or any other suitable communication protocol.

A base station provides a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

A communication device 20 may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

Wireless link 24 between communication devices 20a and 20b may be a radio frequency link that is cellular in network organization. Wireless link 24 may be used to communicate a signal between communication devices 20a and 20b.

Modifying communication device 20a includes a signal modifier 28 that modifies one or more signals in accordance with feedback information received from feedback communication device 20b. According to one embodiment, modifying a signal may be described as applying a diversity parameter adjustment. According to the embodiment, a diversity parameter represents a feature of a signal that may be modulated, for example, relative phase, relative amplitude, absolute power, frequency, timing, other suitable signal feature that may be modulated, or any combination of the preceding. Relative phase may refer to the phase difference between the phase of a first signal of a first transmit antenna element and the phase of a second signal of a second transmit antenna element. Relative amplitude may refer to the ratio between the amplitude of the first signal and the amplitude of the second signal. Absolute power may refer to the total power transmitted by modifying communication device 20a.

A signal may be modified by applying a diversity parameter adjustment to the signal, which may increase constructive interference or reduce destructive interference. According to one embodiment, a next diversity parameter adjustment f(k+1) may be calculated from a current diversity parameter f(k) and a diversity parameter increment Δf(k) according to Equation (1):

$$f(k+1)=f(k)+\Delta f(k) \quad (1)$$

where k represents an iteration.

Signal modifier 28 may use feedback information to determine a diversity parameter adjustment for a next setting. The feedback information may indicate, for example, whether modifying communication device 20a should increase or reduce transmission power. Feedback information may be obtained from a feedback signal in any suitable manner. According to a first example technique, signal modifier 28 obtains feedback information from a quality indication signal received from feedback communication device 20b. A quality indication signal may refer to a signal that describes a quality of a signal transmitted by modifying communication device 20a as received by feedback communication device 20b.

According to a second example technique, signal modifier 28 obtains feedback information from a control signal generated by a baseband subsystem of modifying communication device 20a. A control signal may refer to a signal that provides instructions to a component of a communication device. According to the embodiment, the baseband subsystem extracts feedback information from a quality indication signal from feedback communication device 20b, and generates a control signal that reflects the feedback information. For example, the control signal may provide instructions on whether to increase or reduce transmission power in accordance with the feedback information. According to one embodiment, a control signal may comprise a pulse-density modulation (PDM) signal comprising a sequence of bits that control the transmit power in any suitable manner. For example, the density of a particular value, such as 1, may control the transmit power. The diversity of a value in a sequence of bits may refer to the proportion of bits that have the value. The density may operate with other parameters, such as binary range control parameters, to control the power.

Scanner 32 operates to perform diversity parameter scans. In general, a diversity parameter scan may refer to a scan that tests one or more values of one or more diversity parameters. A signal may be modified according to the one or more diversity parameter values. Feedback information describing the signals in response to the adjustments may be used to evaluate the tested values.

According to one embodiment, a diversity parameter scan may have a scan sequence that includes one or more scans, where scans may be separated by an interval. A scan may have one or more cycles, where each cycle may include one or more tests. A test may refer to a process during which a diversity parameter vector is tested. A diversity parameter vector may refer to a logical construct that includes diversity parameter values for diversity parameters to be tested. As an example, a diversity parameter vector may include values for an amplitude parameter and a phase parameter. During a test, the signal may be adjusted according to the values of the diversity parameter vector. Feedback information describes the signal modified according to the diversity parameter vector. One or more measurements of the feedback information may be made in order to evaluate the values of the diversity parameter vector.

Feedback communication device 20b generates feedback information that reflects the quality of the modified signals. The quality may be determined in any suitable manner. As an example, a higher signal-to-noise ratio (SNR), or energy per bit to the spectral noise density ($E_b N_0$), may indicate a higher signal quality. In other examples, the quality may be determined using any suitable measurements, for example, receive signal power ($P_R$), bit error rate (BER), frame error rate (FER), other measurement, or any suitable combination of the preceding. Typically, a higher signal-to-noise ratio, a lower bit error, or a lower frame error rate indicate higher signal quality. According to one example, a signal is transmitted with a particular power and diversity parameter values. Feedback communication device 20b measures the receive power and signal quality. Some diversity parameters may yield higher signal quality, whereas other diversity parameters may yield lower signal quality.

Feedback communication device 20b includes a feedback generator 30 that generates feedback information that reflects the quality of the modified signals. As an example, the feedback information may describe a signal change needed for the signal to comply with reception criteria of feedback communication device 20b. The feedback information may include one or more quality indicators. According to one embodiment, a quality indicator may instruct modifying communication device 20a to increase or decrease transmission power. An up value instructs modifying communication device 20a to increase the total power of its transmitted signal, and a down value instructs modifying communication device 20a to decrease the total power. A quality indicator may comprise, for example, a power control bit (PCB) of a code division multiple access (CDMA) power control signal or a transmit power control bit (TPB) of a wideband code division multiple access (WCDMA) power control signal. The quality indicators may be sent to modifying communication device 20a in a quality indication signal. According to another embodiment, a quality indicator may identify specific diversity parameter values that are better than other diversity parameter values. As an example, the quality indicators may indicate that a specific test that tests a specific diversity parameter vector is better than the other tests.

A component of network 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to communication network 10 without departing from the scope of the invention. Additionally, operations of communication network 10 may be performed using any suitable logic. As used in this document, "each" refers to each member of a set or each member of a subset of a set. A subset of a set may include none, some, or all elements of the set.

FIG. 2 is a block diagram illustrating one embodiment of a scanner 50 operable to perform a diversity parameter scan. According to one embodiment, scanner 50 may be used with modifying communication device 20a.

According to the illustrated embodiment, scanner 50 includes an interface (IF) 52, a memory 54, and logic 56 coupled as shown in FIG. 2. Memory 54 may store any suitable information that may be used for a diversity parameter scan. According to the illustrated embodiment, memory 54 stores scan parameters 60. A scan parameter may refer to a parameter that describes a scan process. Typically, a parameter may have a value in a specific range of values. A parameter may be expressed in any suitable units, for example, in units of time, degrees, distance, cycles, voltage, other unit, or any suitable combination of the preceding period.

Example scan parameters 60 may include scan process parameters and diversity parameters. Scan process parameters may include parameters that define how the scans are performed, and diversity parameters describe how to modify a signal.

Scan process parameters may include any suitable parameters, for example, dwell time and duration parameters that describe the duration of a particular part of a scan. A dwell time parameter may define the duration of a single test, that is, how long a diversity parameter vector is tested. A dwell time parameter may be expressed in units of time, number of system time slots, other unit, or any combination of preceding. A scan duration parameter may define the duration of a scan. As an example, a scan duration parameter may designate a number of dwell time cycles of one cycle of a scan. An interval duration parameter may define the duration of an interval between scans, and may be expressed in units of time, other unit, or any combination of preceding. Example interval duration parameter values includes less than 2 seconds, such as one second. A cycle duration parameter may define the duration of a cycle, and may be expressed in units of time, number of tests, other unit, or other suitable parameter. Example cycle duration parameter values may include 10 to 15 tests per cycle.

In general, scan parameters may be static or dynamic. A static parameter may refer to a parameter that has a value that remains constant during the scan process. A dynamic parameter may refer to a parameter that has a value that may be adjusted, for example, in response to results of previous scans. As a first example, the dwell time parameter value for a first set may be 4 system time slots, and the dwell time parameter value for a second set may be 6 system time slots. As a second example, the dwell time parameter value for a set may be 4 system time slots for a first scan and 5 system slots for another scan.

Values for dynamic parameters may be determined in accordance with previous or required results. As a first example, measurements may indicate that scan parameter values, such as diversity parameter values, that yield higher signal quality fall within a particular range. In response, future scans may focus on the range. As a second example, measurements may experience high variability, such as when modifying communication device 20a is moving. In response, values for a duration parameter, such as the interval duration parameter or scan duration parameter, may be reduced in order to perform more or shorter scans. If the feedback information indicates that the variability of measurements is too high to yield reliable information, the interval duration parameter may be increased to wait to perform scans under better conditions.

According to the illustrated embodiment, logic 56 includes a director 64 and an evaluator 66. Director 64 provides instructions to signal modifier 20a to modify the signals according to the parameter values of a scan process. For example, director 64 may instruct signal modifier 28 to perform a scan process according to scan process values and to apply adjustments according to the diversity parameter values. Evaluator 66 obtains measurements from the feedback information and evaluates the diversity parameter values according to the measurements, initial conditions, and specific network characteristics. As an example, values that correspond to a lower transmit power may be regarded as better than values that correspond to a higher transmit power.

Interface 52, memory 54, and logic 56 may be integrated or separated according to particular needs. For example, the present invention contemplates the functions of both logic 56 and memory 54 being provided using a single device, for example, a single integrated circuit. If any of the components of scanner 50 are separated, the separated components may be coupled using a bus or other suitable link.

Modifications, additions, or omissions may be made to scanner 50 without departing from the scope of the invention. The components of scanner 50 may be integrated or separated according to particular needs. Moreover, the operations of scanner 50 may be performed by more, fewer, or other modules. Additionally, operations of scanner 50 may be performed using any suitable logic.

FIG. 3 is a flowchart illustrating one embodiment of a method for performing a diversity parameter scan that may be used by scanner 50 of modifying communication device 20a of FIG. 2. Scanner 50 may perform the diversity parameter scan to determine optimal diversity parameter values that may be used to modify a signal transmitted from modifying communication device 20a to feedback communication device 20b.

The method begins at step 100, where scan parameter values are accessed. The scan parameter values may include, for example, scan process values that describe how the scan process is to be performed and diversity parameter values that describe how to modify a signal transmitted from modifying communication device 20a to feedback communication device 20b. According to one embodiment, scanner 32 may access the scan parameter values from scan parameters 60 stored in memory 54. Scan parameter values for a scan are set at step 104. The scan parameter values for the scan may be selected from the accessed scan parameter values.

The scan is initiated at step 108. A scan may have one or more cycles, where each cycle may include one or more tests. A cycle of the scan is run at step 112. Tests of the cycle are performed at step 116. A test may be performed to test diversity parameter values of a diversity parameter vector. During a test, signal modifier 28 may modify a signal according to the diversity parameter values.

Measurements of the test are collected at step 120. Scanner 32 may collect the measurements from a feedback signal that reflects feedback information sent from a feedback communication device 20b. A next cycle may be run at step 124. If a next cycle is to be run, the method returns to step 112, where the next cycle is run. If a next cycle is not to be run at step 124, the method proceeds to step 128.

A scan parameter value may be adjusted at step 128. A scan parameter value may be adjusted in response to the measurements. As an example, measurements may indicate that scans that yield higher signal quality have scan parameter values, such as diversity parameter values, that fall within a particular range. Accordingly, the scan parameter may be adjusted to fall within the indicated range. If a scan parameter value is to be adjusted, the method proceeds to step 132, where the value is adjusted. The method then proceeds to step 136. If a scan parameter value is not to be adjusted at step 128, the method proceeds directly to step 136.

A next scan may be performed at step 136. A scan may be run any suitable number of times in any suitable manner. As an example, a scan may be run once or periodically to determine prospective and eventually optimal diversity parameter values. As another example, a scan may be deactivated in certain situations, such as when the feedback signal does not include reliable feedback information. If a next scan is to be performed at step 136, the method returns to step 104 to select scan parameter values for the next scan. If a next scan is not to be performed at step 136, the method proceeds to step 140.

Optimal diversity parameter values are established at step 140 by evaluating the collected measurements. An optimal diversity parameter value may refer to a diversity parameter value that yields desired results. For example, diversity parameter values that yield higher signal quality may be regarded as optimal diversity parameter values. After establishing the optimal diversity parameter values, the method terminates.

Modifications, additions, or omissions may be made to the method without departing from the scope of the invention. The method may include more, fewer, or other steps. Additionally, steps may be performed in any suitable order without departing from the scope of the invention.

The results of a diversity parameter scan may be used in any suitable manner. According to a first embodiment, the results may be used to adjust parameters of future scans. For example, optimal diversity parameter values may fall within a particular range. Future scans may test prospective diversity parameter vectors with diversity parameter values within the range. According to a second embodiment, the results may be used to adjust parameters during the interval between scans. For example, optimal diversity parameter values may be used to modify the signal during the intervals.

According to a third embodiment, the results may be used in other diversity control techniques. As an example, optimal diversity parameter values may be used as initial conditions for predetermined setting techniques that use predetermined diversity parameter values. The values may be constant or change in a predetermined manner. As another example, optimal diversity parameter values may be used as initial conditions for tracking techniques, such as perturbation techniques or window techniques. According to an example perturbation technique, feedback information is obtained from a quality indication signal from feedback communication device 20b. Adjustments may be applied to consecutive slots in accordance with the feedback information. For example, if the feedback information indicates a power increase in response to one adjustment and a power decrease in response to the other adjustment, the next adjustment may be made in the direction of the adjustment associated with the power decrease.

According to an example window technique, feedback information is obtained from a control signal generated at modifying communication device 20a in response to a quality indication signal. A control signal has windows, where a window corresponds to a frame of the quality indication signal. A window power value represents the power of a window, and a power change refers to the difference between the window power of a preceding window and the window power of a current window. A power trend refers to the change of power within a window, and a power trend change refers to the difference between the power trend of a preceding window and the power trend of a current window. A diversity parameter adjustment may be determined in accordance with the feedback information reflected in the power trend change and power change. If the feedback information for an adjustment in one direction indicates that the power should be decreased, a next adjustment may be made in the same direction. Otherwise, the next adjustment may be made in the other direction.

Certain embodiments of the invention may provide one or more technical advantages. A technical advantage of one embodiment may be that a diversity parameter scan may be performed to determine optimal diversity parameter values. The optimal diversity parameter values may be used to modify a signal transmitted from a modifying communication device to a feedback communication device. As a first example, the optimal diversity parameter values may be used to modify the signal during scans. As a second example, the optimal diversity parameter values may be used to modify the signal during an interval between scans. As a third example, the optimal diversity parameter values may be used to as initial conditions for a diversity control technique.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for modifying a signal according to a diversity parameter adjustment, comprising:
   accessing at a mobile communication device a plurality of scan parameter values for a plurality of scan parameters, a scan parameter describing a sequential scan process, the plurality of scan parameter values comprising a plurality of diversity parameter vectors, a diversity parameter vector comprising a diversity parameter value for each of one or more diversity parameters; and
   performing by the mobile communication device the sequential scan process by repeating in sequence the following for each diversity parameter vector of the plurality of diversity parameter vectors:
   modifying a signal according to the diversity parameter values of the diversity parameter vector;
   transmitting the signal from the mobile communication device to a feedback communication device; and
   receiving from the feedback communication device a feedback signal reflecting feedback information describing the signal as received by the feedback communication device.

2. The method of claim 1, wherein performing the scan process by repeating the following for each diversity parameter vector of the plurality of diversity parameter vectors further comprises:
   collecting a measurement from a feedback signal reflecting the feedback information describing the signal modified according to the diversity parameter values of the each diversity parameter vector.

3. The method of claim 1, further comprising:
   identifying a range of diversity parameter values that yields a higher signal quality; and
   modifying the signal according to the diversity parameter values within the identified range.

4. The method of claim 1, further comprising:
   identifying one or more optimal diversity parameter values from the feedback information; and
   modifying the signal according to the one or more optimal diversity parameter values during an interval between the scan and a next scan.

5. The method of claim 1, further comprising:
   identifying one or more prospective diversity parameter values from the feedback information;
   establishing a next scan parameter value for a scan parameter of the plurality of parameters in accordance with the one or more prospective diversity parameter values; and
   replacing the scan parameter value with the next scan parameter value.

6. The method of claim 1, further comprising:
   identifying one or more optimal diversity parameter values from the feedback information; and
   utilizing the one or more optimal diversity parameter values in a diversity control technique.

7. A mobile communication device for modifying a signal according to a diversity parameter adjustment, comprising:
   a memory operable to store a plurality of scan parameter values for a plurality of scan parameters, a scan parameter describing a sequential scan process, the plurality of scan parameter values comprising a plurality of diversity parameter vectors, a diversity parameter vector comprising a diversity parameter value for each of one or more diversity parameters; and
   a processor coupled to the memory and operable to perform the sequential scan process by repeating in sequence the following for each diversity parameter vector of the plurality of diversity parameter vectors:
   modifying a signal according to the diversity parameter values of the diversity parameter vector;
   transmitting the signal from the mobile communication device to a feedback communication device; and
   receiving from the feedback communication device a feedback signal reflecting feedback information describing the signal as received by the feedback communication device.

8. The system of claim 7, the processor further operable to perform the scan process by repeating the following for each diversity parameter vector of the plurality of diversity parameter vectors by:
   collecting a measurement from a feedback signal reflecting the feedback information describing the signal modified according to the diversity parameter values of the each diversity parameter vector.

9. The system of claim 7, the processor further operable to:
   identify a range of diversity parameter values that yields a higher signal quality; and
   modify the signal according to the diversity parameter values within the identified range.

10. The system of claim 7, the processor further operable to:
    identify one or more optimal diversity parameter values from the feedback information; and
    modify the signal according to the one or more optimal diversity parameter values during an interval between the scan and a next scan.

11. The system of claim 7, the processor further operable to:
    identify one or more prospective diversity parameter values from the feedback information;
    establish a next scan parameter value for a scan parameter of the plurality of parameters in accordance with the one or more prospective diversity parameter values; and
    replace the scan parameter value with the next scan parameter value.

12. The system of claim 7, the processor further operable to:
- identify one or more optimal diversity parameter values from the feedback information; and
- utilize the one or more optimal diversity parameter values in a diversity control technique.

13. Logic for modifying a signal according to a diversity parameter adjustment, the logic embodied in a medium in a mobile communication device and operable to:
- access a plurality of scan parameter values for a plurality of scan parameters, a scan parameter describing a sequential scan process, the plurality of scan parameter values comprising a plurality of diversity parameter vectors, a diversity parameter vector comprising a diversity parameter value for each of one or more diversity parameters; and
- perform the sequential scan process by repeating in sequence the following for each diversity parameter vector of the plurality of diversity parameter vectors:
  - modify a signal according to the diversity parameter values of the each diversity parameter vector;
  - transmit the signal from the mobile communication device to a feedback communication device; and
  - receive from the feedback communication device a feedback signal reflecting feedback information describing the signal as received by the feedback communication device.

14. The logic of claim 13, operable to perform the scan process by repeating the following for each diversity parameter vector of the plurality of diversity parameter vectors by:
- collecting a measurement from a feedback signal reflecting the feedback information describing the signal modified according to the diversity parameter values of the each diversity parameter vector.

15. The logic of claim 13, further operable to:
- identify a range of diversity parameter values that yields a higher signal quality; and
- modify the signal according to the diversity parameter values within the identified range.

16. The logic of claim 13, further operable to:
- identify one or more optimal diversity parameter values from the feedback information; and
- modify the signal according to the one or more optimal diversity parameter values during an interval between the scan and a next scan.

17. The logic of claim 13, further operable to:
- identify one or more prospective diversity parameter values from the feedback information;
- establish a next scan parameter value for a scan parameter of the plurality of parameters in accordance with the one or more prospective diversity parameter values; and
- replace the scan parameter value with the next scan parameter value.

18. The logic of claim 13, further operable to:
- identify one or more optimal diversity parameter values from the feedback information; and
- utilize the one or more optimal diversity parameter values in a diversity control technique.

19. A mobile communication device for modifying a signal according to a diversity parameter adjustment, comprising:
- means for accessing a plurality of scan parameter values for a plurality of scan parameters, a scan parameter describing a sequential scan process, the plurality of scan parameter values comprising a plurality of diversity parameter vectors, a diversity parameter vector comprising a diversity parameter value for each of one or more diversity parameters; and
- means for performing the sequential scan process by repeating in sequence the following for each diversity parameter vector of the plurality of diversity parameter vectors:
  - modifying a signal according to the diversity parameter values of the diversity parameter vector;
  - transmitting the signal from the mobile communication device to a feedback communication device; and
  - receiving from the feedback communication device a feedback signal reflecting feedback information describing the signal as received by the feedback communication device.

20. A method for modifying a signal according to a diversity parameter adjustment, comprising:
- accessing at a mobile communication device a plurality of scan parameter values for a plurality of scan parameters, a scan parameter describing a sequential scan process, the plurality of scan parameter values comprising a plurality of diversity parameter vectors, a diversity parameter vector comprising a diversity parameter value for each of one or more diversity parameters;
- performing by the mobile communication device the sequential scan process by repeating in sequence the following for each diversity parameter vector of the plurality of diversity parameter vectors:
  - modifying a signal according to the diversity parameter values of the diversity parameter vector;
  - transmitting the signal from the mobile communication device to a feedback communication device;
  - receiving from the feedback communication device a feedback signal reflecting feedback information describing the signal as received by the feedback communication device; and
  - collecting a measurement from a feedback signal reflecting the feedback information describing the signal modified according to the diversity parameter values of the each diversity parameter vector;
- identifying a range of diversity parameter values that yields a higher signal quality;
- modifying the signal according to the diversity parameter values within the identified range;
- identifying one or more prospective diversity parameter values from the feedback information;
- establishing a next scan parameter value for a scan parameter of the plurality of parameters in accordance with the one or more prospective diversity parameter values;
- replacing the scan parameter value with the next scan parameter value;
- identifying one or more optimal diversity parameter values from the feedback information;
- modifying the signal according to the one or more optimal diversity parameter values during an interval between the scan and a next scan; and
- utilizing the one or more optimal diversity parameter values in a diversity control technique.

* * * * *